United States Patent [19]
Vaiman

[11] Patent Number: 5,205,841
[45] Date of Patent: Apr. 27, 1993

[54] APPARATUS AND METHOD FOR EXTRACTING HYDROGEN

[75] Inventor: Lev A. Vaiman, Bellevue, Wash.

[73] Assignee: TPC Technologies, Inc., Seattle, Wash.

[21] Appl. No.: 862,802

[22] Filed: Apr. 3, 1992

[51] Int. Cl.$^5$ .................. B01D 53/22; B01D 71/02
[52] U.S. Cl. .......................... 55/16; 55/158; 55/524; 427/245; 427/328; 427/405; 427/533
[58] Field of Search ............ 55/16, 68, 158, 524; 427/38, 39, 245, 328, 405; 428/380, 381, 606, 607, 615

[56] References Cited

U.S. PATENT DOCUMENTS

| | | | |
|---|---|---|---|
| 2,773,561 | 12/1956 | Hunter | 55/16 |
| 2,958,391 | 11/1960 | deRosset | 55/16 |
| 3,232,026 | 2/1966 | McKinley | 55/16 |
| 3,350,846 | 11/1967 | Makrides et al. | 55/16 |
| 3,351,487 | 11/1967 | Levine et al. | 117/227 |
| 3,413,777 | 12/1968 | Langley et al. | 55/158 |
| 3,447,288 | 6/1969 | Juda et al. | 55/158 |
| 3,678,654 | 7/1972 | Low et al. | 55/16 |
| 4,063,937 | 12/1977 | Goltsov et al. | 55/16 X |
| 4,536,196 | 8/1985 | Harris | 55/16 |
| 4,589,891 | 5/1986 | Iniotakis et al. | 55/158 |
| 4,655,797 | 4/1987 | Iniotakis et al. | 55/158 X |

FOREIGN PATENT DOCUMENTS 1125108  8/1968  United Kingdom.

Primary Examiner—Robert Spitzer
Attorney, Agent, or Firm—McAndrews, Held & Malloy

[57] ABSTRACT

A membrane for extracting hydrogen from gaseous and gaseous-liquid mixtures at low temperature makes use of a palladium or palladium alloy substrate and permits reduction of the surface resistance of the substrate. The membrane includes combined coatings including vacuum-deposited palladium ions driven into the substrate with inert gas ions and an electrochemically applied catalyst coating in the form of palladium or palladium/platinum black. A method for fabricating the membrane and a method for using the membrane to separate ultrapure hydrogen are also disclosed.

16 Claims, 3 Drawing Sheets

APPARATUS AND METHOD FOR EXTRACTING HYDROGEN

FIELD OF THE INVENTION

This invention relates to membrane technology for extraction of hydrogen from gases and gas-liquid mixtures.

BACKGROUND OF THE INVENTION

Hydrogen has previously been extracted from a mixture of gases by selectively passing it through a metallic membrane which is in contact with the mixture at an elevated temperature. The membrane becomes fragile as the result of its exposure to a high temperature hydrogen environment. It would be desirable to decrease the working temperature of the hydrogen extraction process to increase the reliability of operation of such metal membranes, especially in the presence of reactants or products which cause the membrane to become fragile. However, such processes have not worked satisfactorily at lower operating temperatures.

Accordingly, one object of the present invention is to effectively extract hydrogen at lower temperatures.

A related object of the invention is to provide a hydrogen extraction membrane which can function in both gas and gas-liquid mixtures.

Another object of the invention is to provide a hydrogen extraction membrane having a longer service life than previously known membranes.

Yet another object of the invention is a membrane which can extract hydrogen from active gaseous mixtures at a temperature which minimizes the adsorption of gases on the membrane surface.

Another object of the invention is to expend less energy in a hydrogen extraction process.

Other objects of the invention will be readily apparent to one of ordinary skill in the art who is familiar with the description which follows.

SUMMARY OF THE INVENTION

One or more of these objects is met by the present invention, which includes a novel membrane, a method for manufacturing the membrane, and a process utilizing such a membrane for hydrogen extraction.

One aspect of the invention is an assembly comprising a substrate, a first film, a second film, and a third film. The substrate consists essentially of palladium or an alloy of palladium and has opposed first and second sides. The first film consists essentially of palladium metal overlying the first side of the substrate. (An "overlying" layer is defined herein as either directly adjacent to the reference layer or separated from the reference layer by intervening layers, but preferably directly adjacent to the reference layer.) The second film consists essentially of palladium black or palladium/platinum black overlying the first film. The third film consists essentially of palladium black or palladium/platinum black overlying the second side of the substrate.

Another aspect of the invention is a method of fabricating such an assembly. A substrate consisting essentially of palladium or a palladium alloy and having first and second sides is provided. A first film of a material consisting essentially of palladium is plated in overlying relation on the first side of the substrate. A second film consisting essentially of palladium black or palladium/platinum black is plated in overlying relation on the second side of the substrate. A third film consisting essentially of palladium black or palladium/platinum black is plated in overlying relation on the first film.

Another aspect of the invention is a method of extracting essentially pure hydrogen from a fluid mixture including free molecular hydrogen. This method comprises the steps of providing the membrane described above and exposing the second film of the membrane to a fluid mixture including free hydrogen at a partial pressure of hydrogen and a temperature sufficient to selectively pass hydrogen from the mixture through the membrane. The purified hydrogen which passes through the membrane is then collected at its other side.

One important advantage of this process is that it operates efficiently at lower temperatures than prior processes. Another advantage of the present hydrogen extraction membrane is that it can function in both gaseous and gaseous-liquid mixtures. Furthermore, the hydrogen extraction membrane has a longer service life than previously known membranes. The membrane can also extract hydrogen from active gaseous mixtures at a temperature which minimizes the adsorption of gases on the membrane surface. Less energy is also expended in the present hydrogen extraction process than in prior processes.

DETAILED DESCRIPTION OF THE INVENTION

Figure 1:
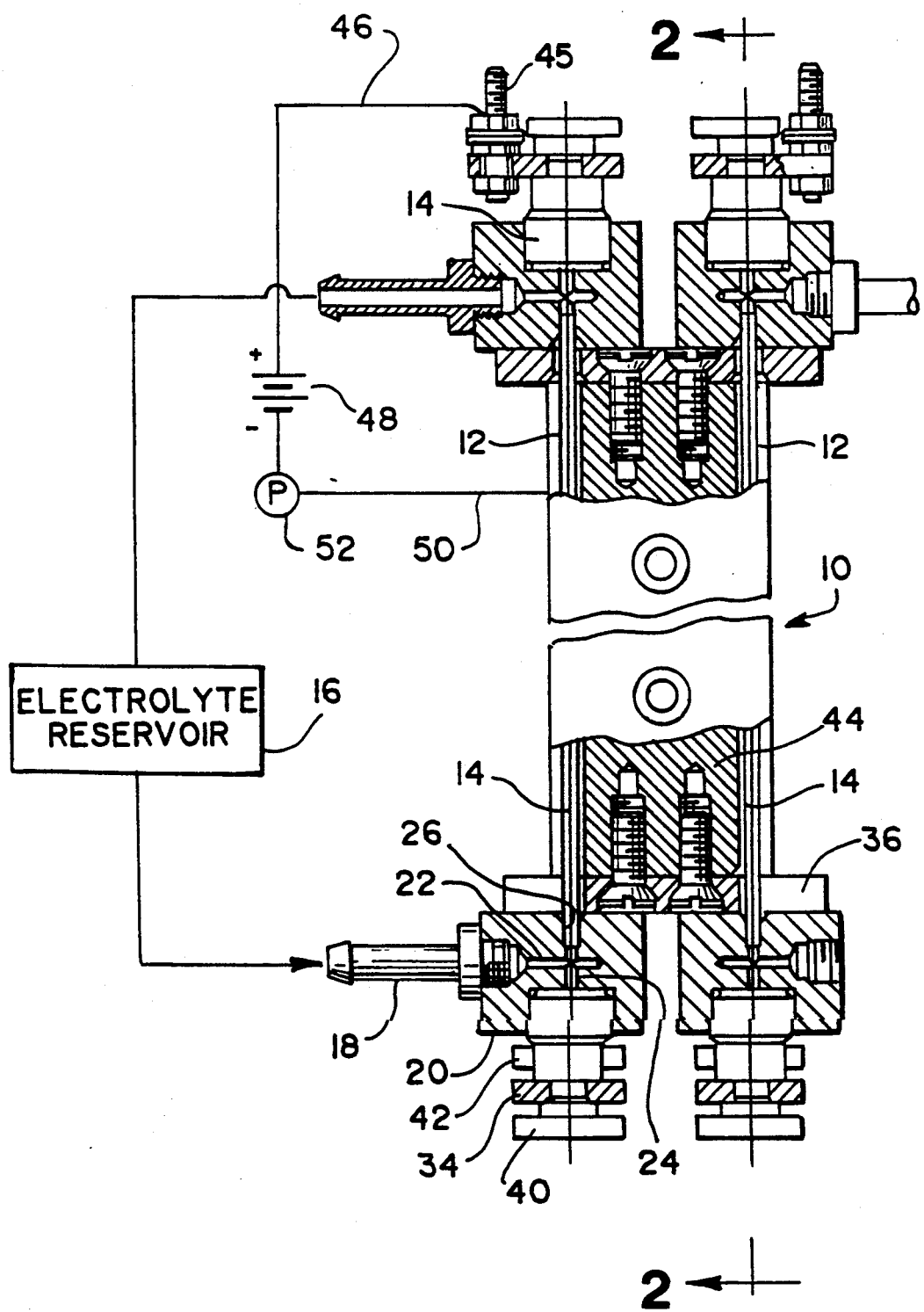
FIG. 1 is sectional view of apparatus for applying palladium black or palladium/platinum black to the interior surface of a palladium tube.

Although the invention will be described in connection with certain preferred embodiments, it is to be understood that the invention is not limited to those embodiments. On the contrary, the invention covers all alternatives, modifications and equivalents within the spirit and scope of the invention as defined by the appended claims.

Addressing first the process of membrane manufacture, the substrate is a palladium or palladium alloy foil with a thickness of, most broadly, from about 0.01 mm. to about 1 mm, preferably from about 0.03 mm to about 0.50 mm, more preferably from about 0.05 to about 0.20 mm. A thinner substrate will be less efficient for separating hydrogen from other constituents, while a thicker substrate will be less permeable to hydrogen. However, these thickness ranges are merely representative, and their endpoints are not critical. The foil has first and second sides.

In an alternate implementation the palladium foil can be made of a palladium alloy. As three examples, the palladium can be alloyed with from about 10% to about 40% by weight silver, or with from about 2% to about 20% by weight ruthenium or rhodium, or with from about 10% to about 30% by weight silver and from about 2% to about 20% by weight nickel. Platinum may also be present in such alloys, as well as other metals which do not interfere materially with the present purpose. The foil preferably is configured as a disk or tube. In a tube according to the present invention, the interior surface and the exterior surface can form the opposed first and second sides of the substrate.

Next, a palladium first film is applied in overlying relation to the first or entrance surface of the substrate (which is to receive the gas or gas-liquid mixture from which hydrogen will be extracted) by vacuum deposition. This film is most broadly from about 0.3 μm to about 10.0 μm thick, preferably from about 0.5 μm to about 5.0 μm thick, most preferably from about 1 μm to about 3 μm thick. The first film is treated with ions of one or more inert gases (preferably nitrogen or argon) having particle energies of, most broadly, from about 10 to about 100 kev, preferably from about 20 to about 70 kev, most preferably from about 30 to about 60 kev. Standard equipment, specifically, a vacuum chamber, a palladium source, and an ion source for processing the substrate is used to fix the first film on the substrate surface. The pressure of the selected ion source in the chamber is preferably not less than about 0.001 torr. A typical treatment time is from about 0.5 to about one hour. If palladium tubes are used to form the substrate, this film preferably is applied on the outside surface of each tube.

Next, both the first film and the second side of the substrate are coated with films of palladium black or palladium/platinum black. The palladium black or palladium/platinum black used here is a finely divided form of the constituent metal (not an oxide, although in other applications palladium or platinum oxides are sometimes called palladium black). Palladium black may be made, for example, by precipitation of palladium metal from a solution of a palladium salt. Palladium/platinum black is made analogously, from mixed salts of palladium and platinum. These films of palladium black or palladium/platinum black are preferably applied electrochemically, using a galvanodynamic method in which the electrochemical coating is applied with the use of a potentiostat. The potentiostat is used to increase the current density from about 3 to about 12 ma/cm$^2$ at a rate of from about 0.2 ma/cm$^2$.min to about 1.5 ma/cm$^2$.min, and preferably about 0.5 ma/cm$^2$.min, during the deposition of the coating.

A particular electrolyte contemplated here is a solution of about 2% Hcl, about 4.5% PtHCl$_2$, and about 2% PdCl$_2$. Under the conditions of reaction, this solution generates palladium black and an insignificant amount of platinum black on the substrate 12. In this embodiment, the inside and the outside of each tube are coated in separate operations.

Figure 2:
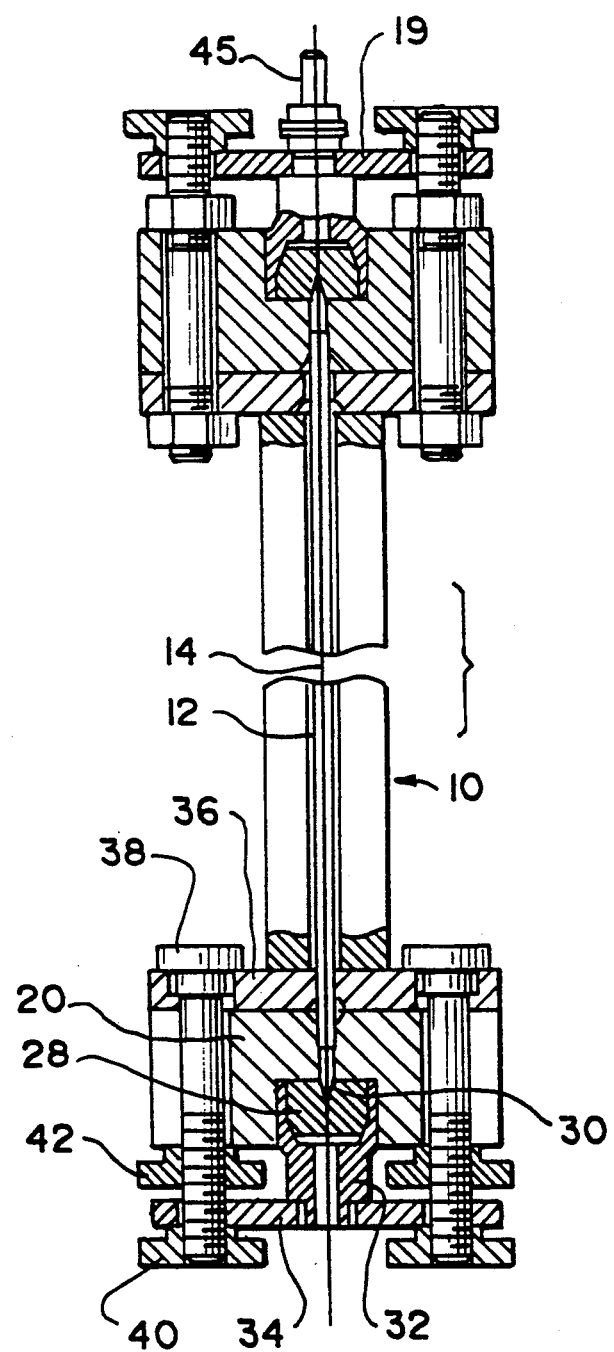
FIG. 2 is a sectional view taken along line B—B of FIG. 1.

Referring now to FIGS. 1 and 2, the apparatus 10 may be used for electrochemically applying a palladium/platinum black film on the interior surfaces of two palladium tubes 12, which serve as cathodes. The anodes are 0.2 mm platinum wires 14 suspended coaxially within the tubes 12.

The electrolyte identified above is directed into the annular space between each tube 12 and wire 14 via an electrolyte reservoir 16, an inlet fitting 18 in a header 20, and intersecting bores 22 and 24 in the header 20. The bore 24 communicates with a larger bore 26. The intersection of the bores 24 and 26 forms a shoulder against which the end of the tube 12 abuts to retain it in place. Identical structure at the other end of the tube 12 is used to direct the electrolyte back to the reservoir 16 and retain the other end of the tube 12. In the preferred embodiment, the tubes 12 stand vertically, and the electrolyte is circulated from the bottom of each tube toward its top.

The platinum electrode wire 14 is drawn coaxially into the tubes 12 and is suspended within the tubes 12 so the tubes 12 and wires 14 never come into physical contact. To maintain this relationship, the ends of the wires are supported by collets 28 having conical bores such as 30 which are small enough at their outer ends to engage the wire 14 when the wire is drawn tight between the collets 28 at each end of the tube 12. The collets 28 are centered and retained by ferrules 32 and by end plates 34 and 36 which are retained by bolts 38 and nuts 40. The nuts 42 retain the end plates 36 against the headers 20. The end plates 36 are fastened to a frame member 44. The headers 20, collets 28, ferrules 32 and end plates 34 are each made of TEFLON (TEFLON is a registered trademark for polytetrafluoroethylene polymers sold by E.I. Du Pont de Nemours & Co., Wilmington, Delaware).

Electrical current is directed through the apparatus 10 as follows. The wires 14 each are clamped to a screw terminal 45 to which the anode lead 46 is also fastened. The lead 46 connects the wire 14 to the positive terminal of a power supply 48. The negative terminal of the power supply 48 is connected via the cathode lead 50 to the tube 12. (The cathode electrical connection is not illustrated in detail in the Figures, and is conventional.) A potentiostat 52 is included in the electrical circuit to control the current density as described previously. The palladium/platinum black coating is most broadly applied at a coating weight of from about 1 mg/cm$^2$ to about 10 mg/cm$^2$, preferably from about 3 mg/cm$^2$ to about 8 mg/cm$^2$, most preferably about 5 mg/cm$^2$. Coating weights, instead of thicknesses, of the metal black coating are given because a coating of a metal black has a rough surface which varies substantially in thickness over its area.

After their inside surfaces have been coated with palladium/platinum black, the tubes 12 are removed from the apparatus of FIGS. 1 and 2 and the outside palladium/platinum black coating is done analogously to the inside coating process, in conventional electroplating apparatus. This outer coating is preferably about as thick as the inside coating, and preferably lies within the same broad and preferred thickness ranges.

The tubes 12 are then heated in a furnace at from about 180° C. to about 240° C., preferably about 200° C., for from about 1.5 to about 2 hours in an atmosphere of hydrogen at, for example, one atmosphere pressure. The atmosphere can also be hydrogen diluted with up to 75% of a gas which is inert to hydrogen and the tubes 12 under the conditions of treatment, such as nitrogen. This step may also be carried out after the tubes 12 are fabricated into the apparatus of FIG. 3. The purpose of this step is to produce palladium hydride and to activate surface centers on the surfaces of the tubes 12.

Figure 3:
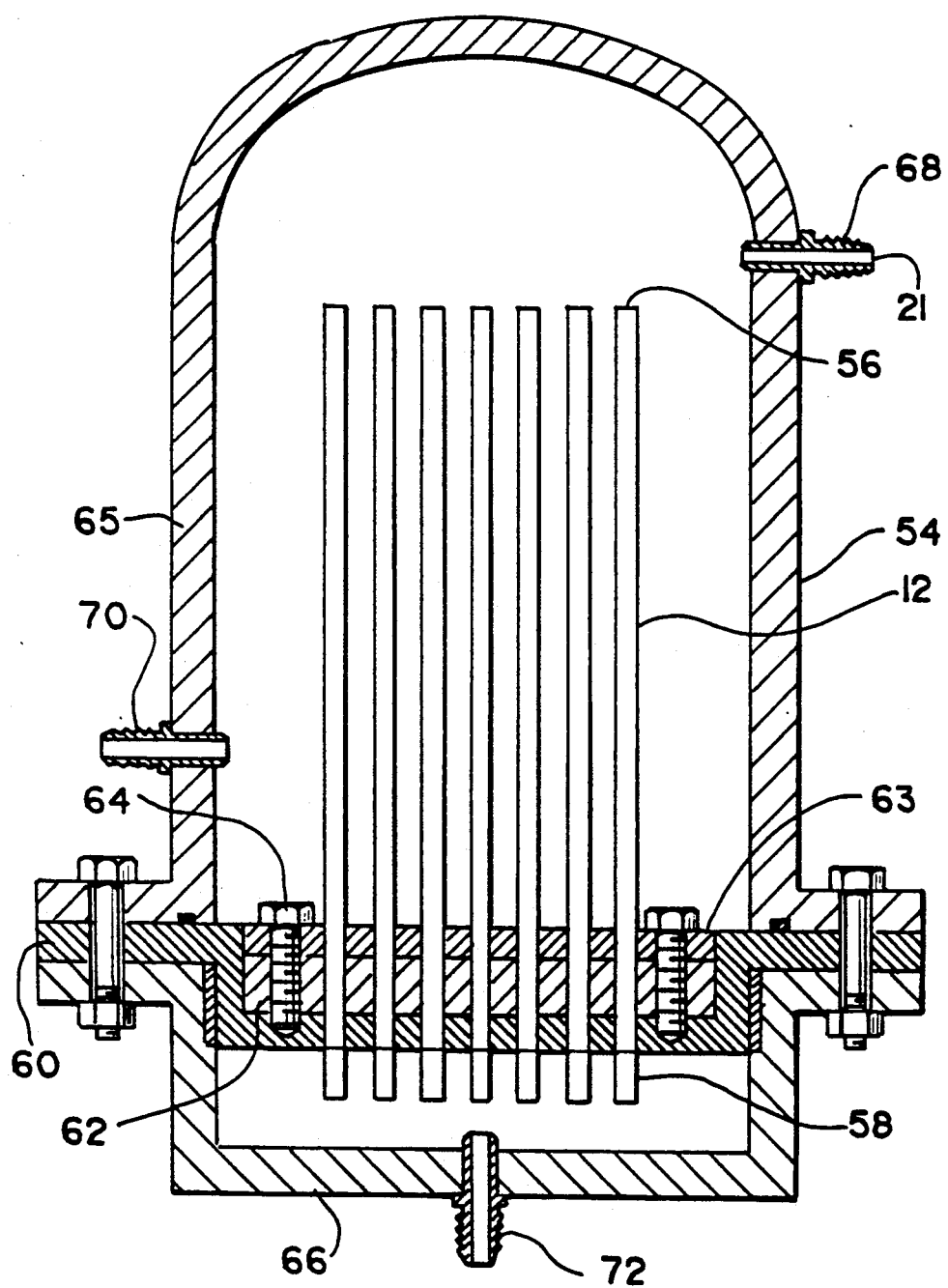
FIG. 3 is a schematic sectional view of a hydrogen separator with active tube-membranes.

FIG. 3 illustrates an apparatus 54 for separating hydrogen gas from a gas-liquid and/or gas mixture containing free hydrogen. The tubes 12 each have one end 56 which is plugged and a second end 58 which is open. The second ends 58 are mounted in and communicate through a retention plate 60. A seal is maintained between the tubes 12 and the plate 60 by a rubber gasket 62 which is pressed against the plate 60 by a cover plate 63 secured by the fasteners 64.

The assembly of the tubes 12 and the retention plate 60 is installed as a divider to separate the vessel 54 into an inlet portion defined by a jar 65 and an outlet vessel defined by a plenum 66. The jar 65 and plenum 66 are bolted and sealed to the respective sides of the retention plate 60. The jar 65 has an inlet and outlet, respectively 68 and 70, for feeding a mixture of hydrogen and other fluids from which hydrogen is to be extracted.

The partial pressure of hydrogen within the jar 65 causes the hydrogen to impinge on the outsides of the tubes 12, selectively penetrate to the interiors of the tubes 12, then pass through the ends 58 of the tubes 12 into the plenum 66. In a preferred embodiment, the plenum 66 can be a collapsible bag or bellows and the tube ends 58 can be flush with the retention plate 60 so the air enclosed within the plenum 66 can be expelled through the outlet 72 by collapsing the plenum 66 against the retention plate 60. The plenum 66 can also be flushed with hydrogen to still further decrease the proportion of contaminants in the plenum 66.

The hydrogen collected in the plenum 66 is exceedingly pure. The product has seven to nine "nines" purity, which means that the product is from about 99.99999% to about 99.9999999% pure hydrogen.

The present hydrogen extracting membranes operate at lower temperatures than currently available membranes. For example, a temperature range of from about 20° C. to about 300° C., and more particularly from about 180° C. to about 210° C. can be used to separate hydrogen from mixtures of hydrogen and carbon monoxide. At these temperatures (particularly the cooler ones), the adsorption of carbon monoxide on the membrane surface is minimized. Since the absorption of carbon monoxide is minimal, the hydrogen has better access to the membrane surface, so the flow of hydrogen is increased.

EXAMPLE

The apparatus of FIG. 3 and the conditions described above and in Table 1 were used to separate hydrogen gas from various inlet gas compositions identified in the left column of Table 1. (Table 1 presents the same data twice, using two different units of measurement. The second portion of the table is derived from the first, and thus has additional rounding errors compared to the first table.) The pressure of the experiment was essentially atmospheric pressure.

In a control run, the apparatus of FIG. 3 was used in separate runs at each of the temperatures in Table 1, but to provide a control the tubes 12 were untreated palladium tubes instead of tubes treated as described above. The resulting rate of hydrogen extraction from an atmosphere of 99% hydrogen was too low to measure at the indicated temperatures below 250° C. At 250° C., the yield of hydrogen was 0.02 liters at STP (STP, or standard temperature and pressure, is 0° C. and one atmosphere pressure) per hour per square inch of tube surface (0.01 liters per second per square meter of tube surface).

The modified palladium tubes according to the present invention yielded four times as much hydrogen at 20° C. as the control tubes yielded at 250° C. At 250° C., the tubes of the present invention yielded 1.33 liters/hour.inch$_2$ (0.57 liter/sec.m$_2$). This is about 67 times as much hydrogen as the control tubes yielded under the same conditions.

The remaining runs illustrate that the rate of hydrogen generation was reduced when the partial pressure of the hydrogen dropped, or when carbon monoxide or carbon dioxide were present. Nonetheless, the rate of hydrogen separation was much higher from these gas mixtures, according to the present invention, than from almost pure hydrogen in the control.

TABLE 1

| Inlet Gas Composition | Mixed Units Yield of H$_2$ at STP (liter/hour · inch$_2$) | | | | | |
|---|---|---|---|---|---|---|
| | 20°C. | 100° C. | 150° C. | 180° C. | 200° C. | 250° C. |
| H$_2$, 99% (control) | — | — | — | — | — | 0.02 |
| H$_2$, 99% | 0.08 | 0.45 | 0.51 | 0.60 | 0.85 | 1.33 |
| H$_2$, 50%; N$_2$, 50% | 0.08 | 0.45 | 0.51 | 0.60 | 0.85 | 1.33 |
| H$_2$, 50%; CO$_2$, 50% | 0.07 | 0.43 | 0.48 | 0.57 | 0.82 | 1.25 |
| H$_2$, 40%; N$_2$, 30%; CO, 20%; CO$_2$, 10% | — | — | 0.03 | 0.15 | 0.29 | 0.25 |

TABLE 1

| Inlet Gas Composition | All Metric Units Yield of H$_2$ at STP (liter/sec · m$_2$) | | | | | |
|---|---|---|---|---|---|---|
| | 20° C. | 100° C. | 150° C. | 180° C. | 200° C. | 250° C. |
| H$_2$ 99% (control) | — | — | — | — | — | 0.01 |
| H$_2$, 99% | 0.03 | 0.19 | 0.22 | 0.26 | 0.37 | 0.57 |
| H$_2$, 50%; N$_2$, 50% | 0.03 | 0.19 | 0.22 | 0.26 | 0.37 | 0.57 |
| H$_2$, 50%; CO$_2$, 50% | 0.03 | 0.19 | 0.21 | 0.25 | 0.35 | 0.54 |
| H$_2$, 40%; N$_2$, 30%; CO, 20%; CO$_2$, 10% | — | — | 0.01 | 0.06 | 0.12 | 0.11 |

What is claimed is:

1. A membrane comprising:
   A. a substrate consisting essentially of palladium metal and having opposed first and second sides;
   B. a first film consisting essentially of palladium metal applied in overlying relation to the first side of said substrate;
   C. a second film consisting essentially of a metal black selected from the group consisting of palladium black and palladium/platinum black overlying said first film; and
   D. a third film consisting essentially of a metal black selected from the group consisting of palladium black and palladium/platinum black overlying the second side of said substrate.

2. The membrane of claim 1, wherein said substrate is tubular.

3. The membrane of claim 1, which is selectively permeable to hydrogen gas at a temperature less than 250° C.

4. A method of extracting essentially pure hydrogen from a fluid mixture including free molecular hydrogen, comprising the steps of:
   A. providing the membrane of claim 1;
   B. exposing the second film of said membrane to a fluid mixture including free hydrogen at a partial pressure of hydrogen, pressure drop across said membrane, and a temperature, and for a time sufficient to selectively pass hydrogen from said mixture through said membrane; and
   C. collecting the hydrogen passed through said membrane.

5. The hydrogen extraction method of claim 4, wherein said temperature is from about 20° C. to about 300° C.

6. A method of fabricating a membrane, comprising the steps of:

A. providing a substrate consisting essentially of palladium and having first and second sides;
B. applying a first film of a material consisting essentially of palladium overlying the first side of said substrate;
C. applying a second film consisting essentially of a metal black selected from the group consisting of palladium black and palladium/platinum black overlying the second side of said substrate; and
D. applying a third film consisting essentially of a metal black selected from the group consisting of palladium black and palladium/platinum black overlying said first film.

7. The fabricating method of claim 6, wherein said first film is from about 1 μm to about 3 μm thick.

8. The fabricating method of claim 6, comprising the further step, after said first film applying step, of bombarding said first film with ions of an inert gas having an energy of from about 30 to about 60 kev under conditions effective to improve the adhesion of said first film.

9. The fabricating method of claim 6, wherein said palladium and palladium/platinum black applying steps are carried out by galvanic plating.

10. The fabricating method of claim 9, wherein said palladium and palladium/platinum black applying steps are carried out at a current density of from about 3 to about 12 ma/cm$^2$.

11. The fabricating method of claim 10, wherein said current density is increased during said palladium and palladium/platinum black applying steps from an initial value of about 3 to a final value of about 12 ma/cm$^2$.

12. The fabricating method of claim 10, wherein said current density is increased at the rate of about 0.5 ma/min.

13. The fabricating method of claim 9, wherein said palladium and palladium/platinum black are applied at a coating weight of from about 1 mg/cm$^2$ to about 10 mg/cm$^2$.

14. The fabricating method of claim 9, wherein said palladium is applied by providing a platinum anode, using said substrate as a cathode, and using a solution consisting essentially of an aqueous palladium salt as the electrolyte.

15. The fabricating method of claim 14, wherein said aqueous palladium salt consists essentially of:
A. about 4.5% by weight PtHCl$_2$;
B. about 2% by weight PdCl$_2$;
C. about 2% Hcl; and
D. water in an amount effective to disperse the other ingredients.

16. The fabricating method of claim 6, comprising the subsequent step of heating said membrane in a hydrogen environment at about 200° C. for about two hours.

* * * * *